A. W. STORY.
DOOR KNOB ATTACHMENT.
APPLICATION FILED NOV. 3, 1917.
1,334,267. Patented Mar. 16, 1920.
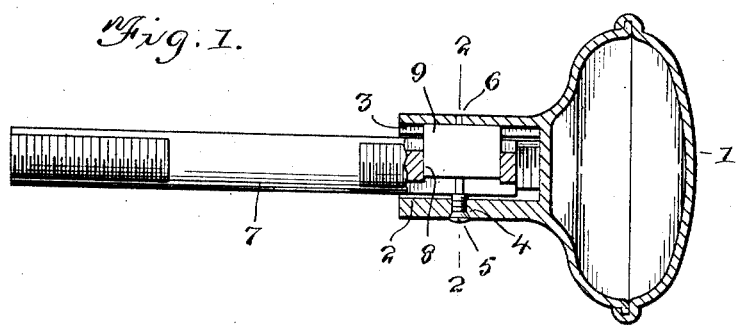
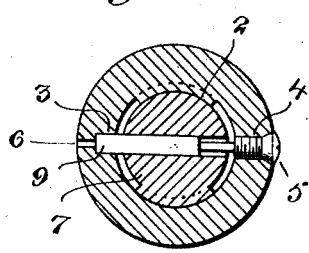
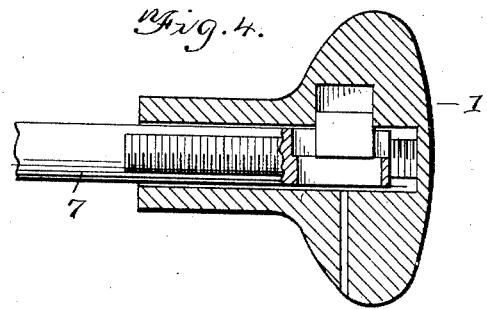
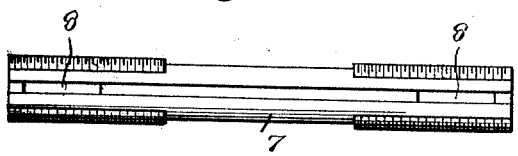
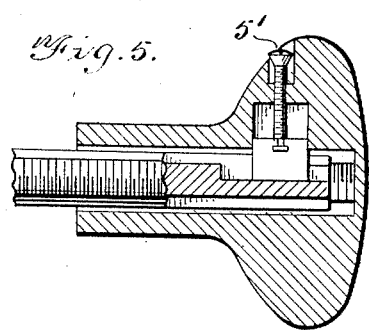
Witness
E. R. Ruppert.
Inventor
A. W. Story
By Victor J. Evans
Attorney

UNITED STATES PATENT OFFICE.

ASA W. STORY, OF VALLEJO, CALIFORNIA.

DOOR-KNOB ATTACHMENT.

1,334,267.    Specification of Letters Patent.    Patented Mar. 16, 1920.

Application filed November 3, 1917. Serial No. 200,106.

*To all whom it may concern:*

Be it known that I, ASA W. STORY, a citizen of the United States, residing at Vallejo, in the county of Solano and State of California, have invented new and useful Improvements in Door-Knob Attachments, of which the following is a specification.

This invention relates to new and useful improvements in door knob attachments and the principal object of the invention is to provide improved means for attaching the knob to its spindle so that the knob is rigidly held and will not rattle and rendering the use of washers and the like unnecessary.

Another object of the invention is to make the parts so that they may be easily and quickly attached and will hold the knob against any movement whatever on the spindle.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal section through one end of the knob and spindle.

Fig. 2 is a cross section on line 2—2 of Fig. 1.

Fig. 3 is a view of the spindle.

Figs. 4 and 5 are views of modifications.

In Figs. 1, 2 and 3 1 indicates the knob having the usual recess 2 in its shank portion and I form a slot 3 in said shank which is in communication with said recess. As will be seen the said recess is provided with interrupted threads and a hole 4 passes through the shank into the recess 2, said hole being screw threaded to receive the screw 5. A small hole 6 is provided in the other side of the shank and leads into the slot 3. 7 represents the spindle of the knob which may be of any desired shape. This spindle has its ends screw threaded, the threads being interrupted as shown so that the spindle may be pushed into the opening 2 in the shank of the knob without the threads engaging, then by giving one part a quarter turn said threads will be thrown into engagement and the spindle secured in the knob. I provide a slot 8 adjacent each end of the spindle, said slot passing transversely through the spindle and opening on the part thereof which is not screw threaded. 9 represents a block, preferably of rectangular shape and of such a size as to fit within the slot 8 without projecting therefrom. In assembling the parts the block 9 is placed within the slot 8 and the knob placed over the end of the spindle. The knob is then given a quarter turn to engage the screw threads and then the screw 5 is inserted in the hole 4. The end of the screw will come in contact with the block 9 thus forcing the same partly out of the slot 8 and into the slot 3, thus the knob is securely locked on the spindle as the block will prevent rotation of the knob on the spindle thus rendering it impossible to disengage the screw threads. When it is desired to remove the knob from the spindle the screw 5 is removed and a small nail or the like driven through the hole 6 to force the block 9 back into the recess 8 thus permitting the knob to be rotated on the spindle.

In the modification shown in Fig. 4 instead of forming the slot in the shank of the knob the same is formed in the body part and the block is located within the slot in the knob. In this construction when the knob is given a quarter turn to throw the screw threads into engagement and to aline the slots the block will drop into the slot in the spindle by gravity. If desired however, I may use a screw in this construction as before and in this case a hole must be provided to receive the nail when it is desired to remove the knob from the spindle.

In the modification shown in Fig. 5 the slot is located in the body part of the knob as in Fig. 4 but in this case the block is swiveled on a screw 5′ so that the same may be raised and lowered by the screw.

The spindle engages with the latch mechanism in any suitable way and as this forms no part of my invention it is not shown nor described.

It is thought from the foregoing description that the advantages and novel features of my invention will be readily apparent.

I desire it to be understood that I may make slight changes in the construction and in the combination and arrangement of the several parts, provided that such changes fall within the scope of the appended claims.

What I claim is:—

1. A device of the class described comprising a knob consisting of a head with a neck integral therewith, said neck having a screw threaded bore and an inclosed recess in the head portion, a spindle having its end screw threaded and an elongated slot therein adjacent its end, a block entirely inclosed by the head and slidingly engaging with said slot and said recess for holding the knob on the spindle against turning movement, said head having a passage therein communicating with the recess and adapted to permit the passage therethrough of means for removing the block from the slot in the spindle and forcing it into the recess in the knob so as to permit the knob to be turned on the spindle.

2. A device of the class described comprising a knob having a screw threaded bore and a recess communicating with said bore, a spindle having its ends screw threaded and having an elongated slot therein adjacent its end, a block entirely inclosed by the knob and slidingly engaging with said slot and said recess for holding the knob on the spindle against turning movement and a screw carried by the knob and engaging the block for adjusting the same.

In testimony whereof I affix my signature.

ASA W. STORY.